United States Patent [19]

Goodsell

[11] 4,093,082

[45] June 6, 1978

[54] IRRIGATION PIPE LAYING AND PICK UP VEHICLE

[76] Inventor: Melton Archie Goodsell, 2325 Olive Rd., Holtville, Calif. 92250

[21] Appl. No.: 710,191

[22] Filed: Jul. 30, 1976

[51] Int. Cl.² .......................... A01G 25/02; F16L 1/00
[52] U.S. Cl. ................... 214/1 PA; 61/105; 180/44 F; 296/3
[58] Field of Search ............... 214/1 PA, 83.1, 83.36; 61/105; 296/3, 26; 180/45, 44 F

[56] References Cited

U.S. PATENT DOCUMENTS

| | | | |
|---|---|---|---|
| 2,487,311 | 11/1949 | Chapin | 285/143 |
| 2,704,162 | 3/1955 | Johnson | 214/1 PA |
| 2,780,376 | 2/1957 | Sanders | 214/1 PA |
| 3,034,668 | 5/1962 | Wicks | 214/83.1 |
| 3,162,469 | 12/1964 | Shohan | 285/5 |
| 3,561,613 | 2/1971 | Moad | 214/1 PA |
| 3,587,885 | 6/1971 | Hanway | 214/84 |
| 3,668,879 | 6/1972 | Ogle | 61/72.6 |
| 3,685,670 | 8/1972 | Meyers | 214/1 PA |
| 3,813,888 | 6/1974 | Purviance | 61/72.6 |
| 3,858,731 | 1/1975 | Briggs | 214/1 PA |
| 3,866,951 | 2/1975 | De Loach | 285/5 |
| 3,895,726 | 7/1975 | Rassieur | 296/26 |
| 3,956,901 | 5/1976 | Brown | 61/72 |

FOREIGN PATENT DOCUMENTS

| | | | |
|---|---|---|---|
| 253,851 | 4/1967 | Austria | 214/1 PA |
| 862,220 | 3/1941 | France | 214/1 PA |
| 999,177 | 7/1965 | United Kingdom | 180/45 |

*Primary Examiner*—Drayton E. Hoffman
*Assistant Examiner*—George F. Abraham
*Attorney, Agent, or Firm*—Brown & Martin

[57] ABSTRACT

A self-propelled vehicle having a centrally mounted inclined guide trough for guiding pipe sections as the vehicle is driven along a row of attached pipe sections. The sections are guided upwardly to the level of a working platform. An angulation trough contacts the end of a pipe section and angulate a first pipe section relative to the next section so that the first section can be disconnected. Disconnected sections are placed in racks on either side of the platform. The two ends of the guide trough have different inclinations to aid in the assembly of the pipe sections when laying pipe.

19 Claims, 7 Drawing Figures

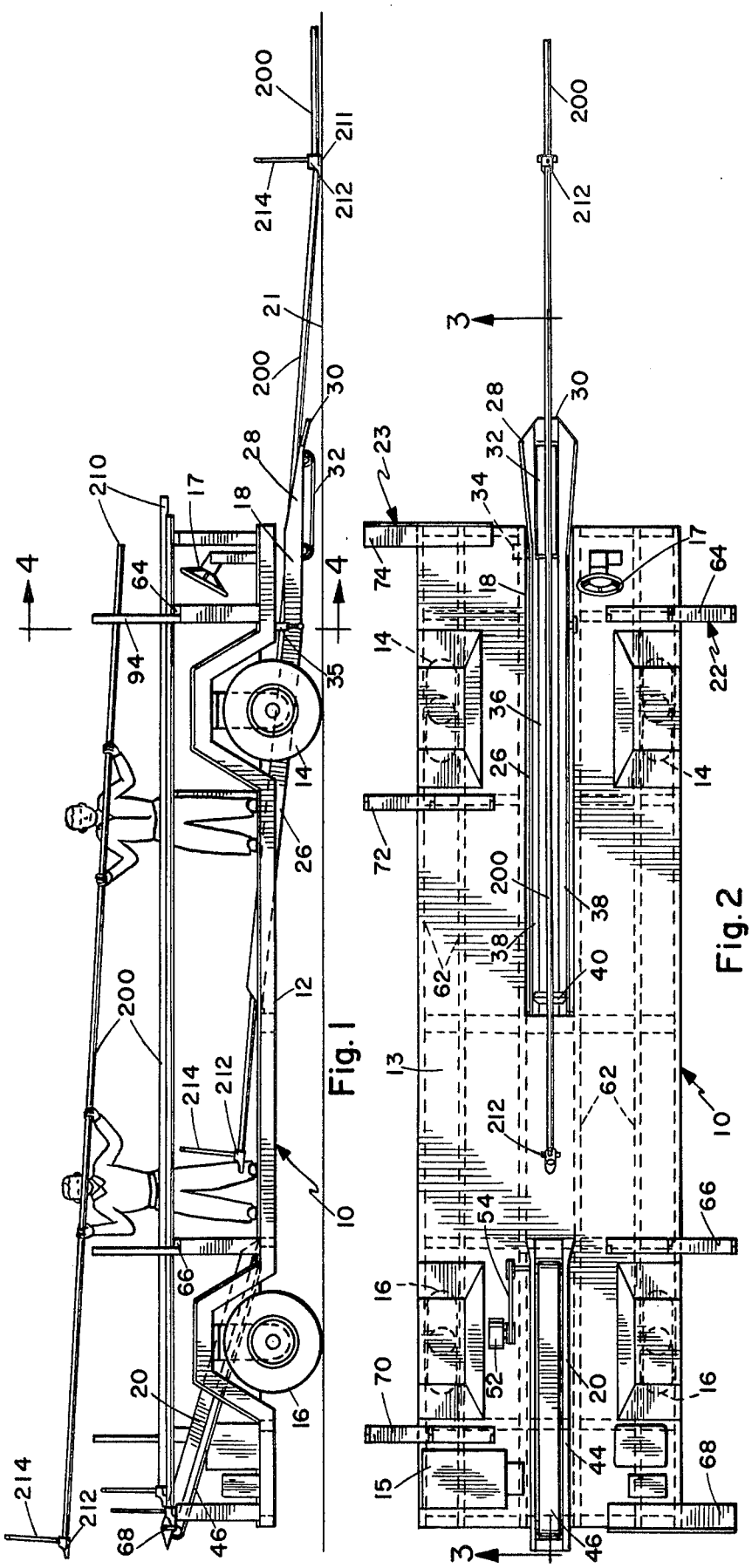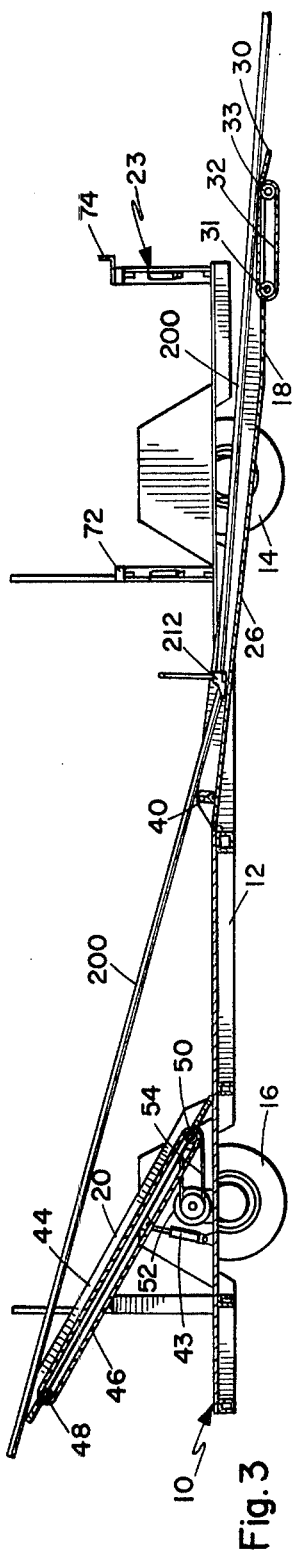

IRRIGATION PIPE LAYING AND PICK UP VEHICLE

BACKGROUND OF THE INVENTION

Modern farming techniques require extensive use of irrigation to maximum crop yields. A particularly prevalent and important irrigation method involves the use of irrigation pipe sections, normally of aluminum tubing that are approximately 30' in length and which each mount a single sprinkler head. Each sprinkler head is sufficient to irrigate an area approximately 30' to 40' from the sprinkler head. The pipe sections incorporate a flange to cause the sprinkler riser to stand upright on the ground. Sections are connected by joint couplings. In one prevalent type, the joint coupling comprises a male/female coupling that is assembled by inserting the male end at an angle into the female coupling and then bringing the pipe sections into alignment.

In order to make maximum use of irrigation piping it is moved from field to field as the need for irrigation changes. According to conventional practice, the pipe is manually assembled and disassembled. In picking up pipe, for example, workers lift one end of a pipe section to angulate it relative to the attached section and then withdraw the male end of the coupling from the female coupling, carry the section over several rows of growing crops to a trailer towed through the field by a tractor or the like, load the pipe onto the trailer and return over the several rows of crops to pick up the next section. Since the workers must walk a considerable distance away from the tractor to retrieve each section, the distance they travel through the fields is many times greater than the length of pipe being retrieved. Filled trailers are towed to the next field to be irrigated where workers laying pipe must await its arrival. The pipe is layed in substantially the reverse manner as it is picked up necessitating the same amount of walking and manual assembly of the pipe sections. The vehicle and driver utilized for towing filled trailers between fields is idle a substantial part of the time waiting for additional trailers to be filled.

Therefore, it is desirable to have a vehicle specifically designed for picking up and laying irrigation pipe which reduces the manpower and equipment required to accomplish the task and to transfer the pipe to another location. Previously suggested designs for such a vehicle have resulted in highly complex apparatus for grasping, angulating, disconnecting, lifting and stacking each pipe section. Such vehicles have a large number of grasping and manipulating mechanisms and the associated hydraulic or other actuators and, as a result, no practical device for picking up and laying irrigation pipe has been successfully manufactured. Such machinery requires a high degree of operator skill and a high level of required maintenance while still producing unacceptable low reliability.

SUMMARY OF THE INVENTION

An exemplary embodiment of the invention overcomes the deficiencies of prior art designs for vehicles for picking up and laying irrigation pipe in a highly simplified vehicle with a good man-machine relationship to greatly increase the number of pipe sections that may be layed or picked up for each man hour utilized and which also increases the efficiency with which the pipe sections may be transferred from field to field. The advantages are obtained in a vehicle that is easy to operate, maintain and highly reliable in service. A guide is mounted at the front of the vehicle and opens onto the line of pipe to be layed or picked up. In picking up pipe, the guide constrains the pipe sections horizontally as the vehicle moves along the line of pipe and forces the end of the pipe upwardly to above the level of the platform on the vehicle. The guide may comprise a series of rollers, belts or other guide for constraining the pipe as it is inclined upwardly by the inclination of the guide and by the forward movement of the vehicle. However, an inclined guide trough has been found to be particularly effective and its use is preferred. It is possible for a worker to disconnect pipe sections shortly after the joint enters the trough by angularly increasing the angulation of the first section relative to the second. However, the use of an auxiliary angulation guide longitudinally aligned with and positioned rearwardly of the inclined guide facilitates the process and reduces the worker effort required. The angulation guide is at a higher angulation than the inclination guide and is positioned to engage the free end of the pipe section and to lift the free end to approximately 20° of angulation relative to the next section. At this angulation, the male coupling may be withdrawn from the female coupling.

As the pipe sections are uncoupled, they are placed on racks at either side of the platform. For laying pipe, the process is reversed and the vehicle operated in the opposite direction. Accordingly, the guide now faces away from the direction of travel of the vehicle. A first section of pipe may be manually placed on the ground and a first coupling made by manually angulating and inserting the male coupling into the female coupling. The section is then placed in the guide. As the vehicle is operated away from the layed sections, the uncoupled end of the pipe is drawn along the guide. A worker then retrieves a pipe section from the rack and lowers the male end of the coupling into engagement with the female coupling on the pipe section being drawn out of the guide. The height of the worker on the platform produces a natural angulation of the pipe section relative to the coupled section so that the male coupling is properly angled to enter the female coupling. The worker then lowers the pipe section into the guide so that the two sections are in substantial alignment and thus, the coupling is completed and causes the new pipe section to be drawn into and eventually out of the guide.

It should be understood that whereas the couplings are described as male being inserted into female, the sections may be laid and picked up with female being placed over a withdrawing male.

When the racks are loaded, the vehicle may transport the pipes directly to an adjacent field or the pipes may be transferred to trailers for this purpose. To facilitate the transfer to trailers, all of the wheels on the vehicle may be turned to a common angle to the longitudinal. The angulation of the wheels causes the vehicle to have a substantial sideward component. With the wheels in this orientation, the vehicle may be driven alongside an appropriate trailer so that the racks overlie the bed of the trailer. The racks are carried on an articulated support structure so that upon actuation the racks move horizontally outwardly from the vehicle and deposit the stacked irrigation pipes onto the bed of the trailer. Further actuation of the rack lowers the rack relative to the bed of the trailer so that the vehicle may then be backed off from the trailer leaving the pipes in position on the trailer bed. The pipes on the opposite side of the vehicle are then deposited on the opposite side of the trailer in a similar manner.

BRIEF DESCRIPTION OF THE DRAWINGS

FIG. 1 is a side elevation view of the vehicle in use.
FIG. 2 is a top plan view of the vehicle.
FIG. 3 is a sectional view taken on line 3—3 of FIG. 2.

DETAILED DESCRIPTION OF THE DRAWINGS

Figure 4:
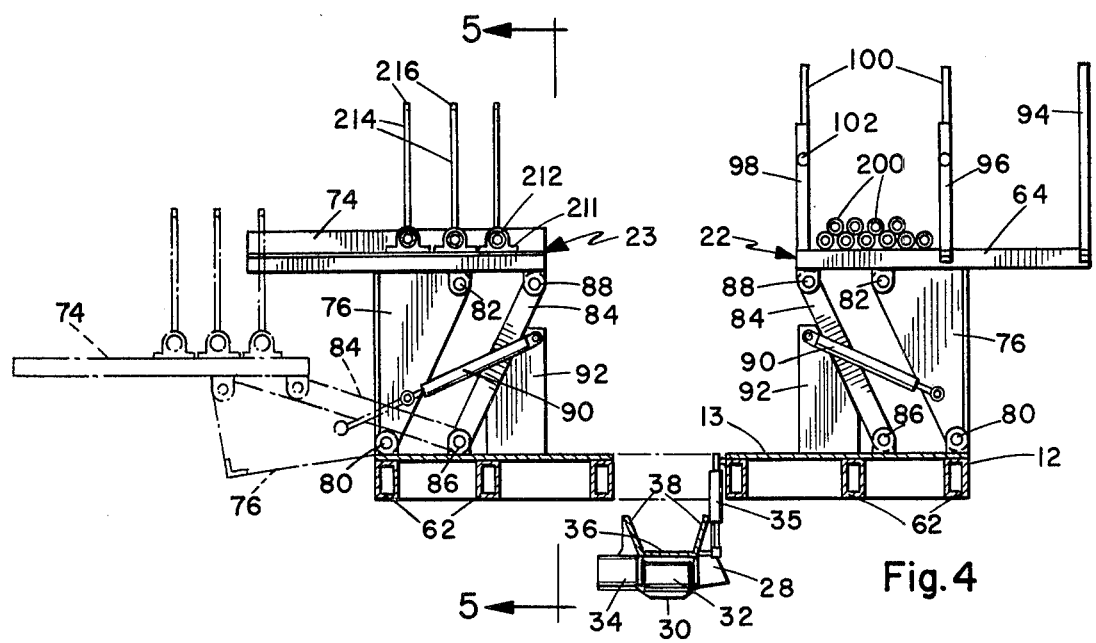
FIG. 4 is an enlarged sectional view taken on line 4—4 of FIG. 1.
Figure 5:
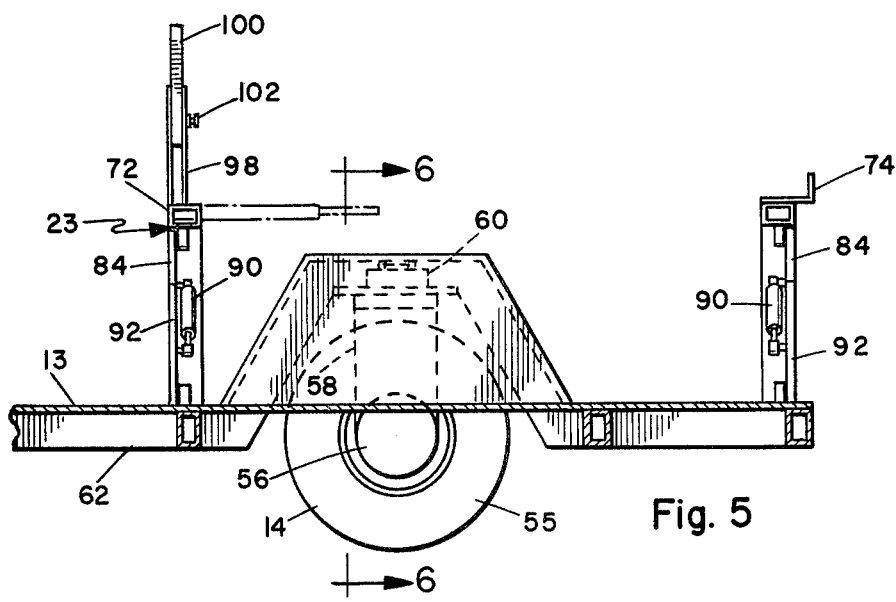
FIG. 5 is a sectional view taken on line 5—5 of FIG. 4.

Referring now to the drawings, there is illustrated a vehicle 10 incorporating a frame 12 supported from forward and rearward wheel pairs 14 and 16. A platform 13 is mounted on the central frame section. Engine 15 driving a hydraulic pump provides the motive power for the vehicle. At least the forward wheel pairs 14 are steerable by wheel steering 17.

An inclined guide trough 18 is located at the forward section of the vehicle and is centrally mounted to extend downwardly from the platform to the proximity of the ground surface 21. An angulation guide trough 20 is mounted at the rearward section of the vehicle in longitudinal alignment with the inclination guide trough 18. Racks 22 and 23 are located on each side of the vehicle adjacent the platform 13 for storage of the pipe sections, various of which are illustrated by the 200 series numbers.

Referring particularly to FIGS. 1 through 3, the detailed construction of the inclined guide trough 18 is illustrated. The initial length of the trough 18 is at a relatively shallow angle to the ground surface 21. The rearward length 26 is at a slightly greater angulation to the ground surface 21 for purposes to appear more fully hereinafter. Sloping sides 38 extend throughout both lengths of the trough 18 and are flared to form flared opening sides 28. The trough 18 terminates in an entry ramp 30. A conveyor 32 is mounted near the forward end of the trough 18 on spaced rollers 31 and 33. Hydraulic motor 34 drives the roller 31. The hydraulic motor 34 may be connected to the return lines of the hydraulic motors driving the wheel pairs 14 and 16 so that the speed of the conveyor 52 is proportional to the speed of the vehicle over the ground surface 21. A solid bottom 36 is formed over the remainder of the trough 18 terminating in a steeply angulated guide section 40 adjacent the rearward end of the trough 18. The overall inclination of the trough to the ground is adjusted with hydraulic cylinder 35.

The angulation trough 20 has sloping sides 44 mating with a conveyor belt 46. The belt 46 operates over rollers 48 and 50. Power to the roller 50 is provided by hydraulic motor 52 operating in a manner similar to the hydraulic motor 34 and driving the roller 50 through a V-belt 54. The angulation of the trough 20 may be adjusted through the use of a hydraulic cylinder 43. The relationship of the maximum height obtainable with the trough 20, the length of a pipe section and the angulation of the trough 18 is selected so that there is maximum relative angulation of approximately 20° between a pipe section on the trough 20 and an attached pipe section being driven into the trough 18.

Figures 6, 7:
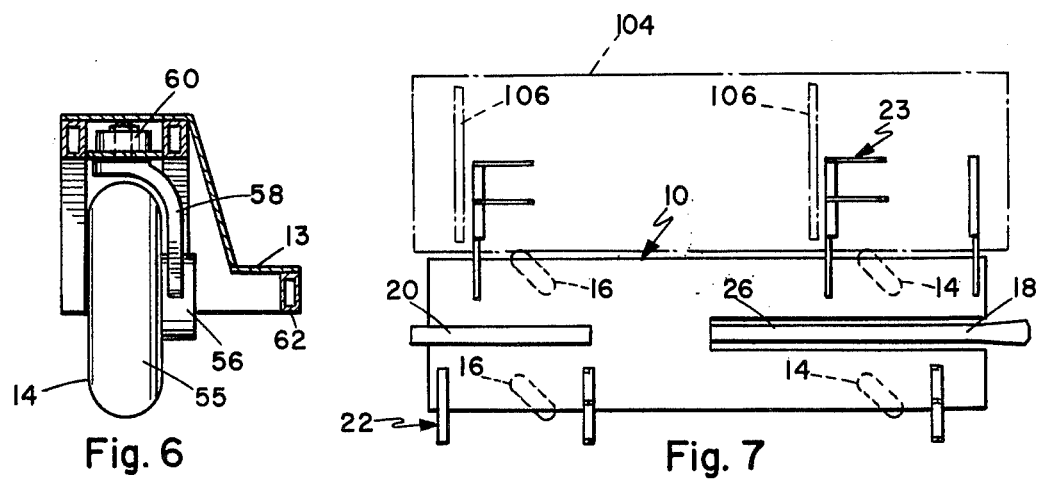
FIG. 6 is a sectional view taken on line 6—6 of FIG. 5.
FIG. 7 illustrates diagramatically the angled approach of the vehicle to a pipe carrying trailer.

Referring to FIG. 6, the arrangement of a typical wheel and drive unit is illustrated. The wheel unit 14 incorporates a high flotation tire 55 mounted on a power hub for operation by a hydraulic motor 56. The motor 56 is connected to the hydraulic pump 19 by hydraulic lines (not shown). Suspension fork 58 pivotally connects the tire 55 for steering rotation relative to the frame on steering bearing 60. The dutilization of the steering capability for the wheel pairs 14 and 16 in loading and unloading stacked pipe will be described more fully hereinafter.

Referring particularly to FIG. 4, the detailed construction of the racks 22 and 23 is illustrated. The platform 13 is carried on a plurality of longitudinal frame members 62. The racks 22 and 23 are arranged on either side of the center line of the vehicle and elevated above the platform 13 by approximately the height of a man's waist. The pipe sections 200 are supported on horizontal supports at each of three points. The pipe sections are oppositely oriented on opposite sides of the vehicle. Accordingly, the forward end of rack 22 accommodates the male coupling ends 210 of the pipes, whereas the forward end of the opposite rack 23 accommodates the female coupling ends 212 of the pipe sections 200. The rack 22 incorporates a flat topped surface horizontal support member 64 for the forward-most support, a similar horizontal support 66 for the middle support and an L-shaped horizontal support 68 for the rearmost support.

It will be apparent that the rearmost support 68 accommodates the ground engaging flange 211 of the pipe sections to hold the pipe risers 214 and sprinkler heads 216 upright. After a complete layer of pipe sections is positioned on the L-section 68, subsequent layers of pipes are stacked and staggered as will be apparent from FIG. 1. For the rack 23, the forward-most horizontal support 74 is an L-shaped member functioning in the identical manner as the L-shaped member 68. The middle and rear most supports for rack 23 are flat horizontal supports 70 and 72 respectively. The middle and male support ends of each of the racks 22 and 23 incorporate uprights to provide stacking for the pipe. The uprights are identical for these horizontal supports and are described in detail in connection with the horizontal support 64 as illustrated in FIG. 4. The outermost support 94 is pivotally connected to the horizontal support 64 so that the upright may be pivoted to a horizontal position for purposes which will be more apparent hereinafter.

The several horizontal supports are carried on parallelogram linkages. Typical linkages are illustrated in FIG. 4 and will be described in connection with horizontal support 74. A combined link and stop member 76 is connected between the platform 13 and horizontal support 74. Pivot 80 connects the link 76 to platform 13. Pivot 82 connects the line 76 to horizontal support 74. Link 84 is mounted parallel to link 76 and is carried on the platform 13 by pivot 86 and on the horizontal support by the link 88. An up limit stop is provided by the stop member 92 and by contact between the link 76 and horizontal support 74. The down limit (as illustrated in dotted lines) is established by contact between the two links 76 and 84. A hydraulic cylinder 90 actuates the linkage between the two limits as will be set forth more fully hereinafter.

The middle and innermost uprights 96 and 98 may also be pivoted to the horizontal. In addition, they are provided with a vertical adjustability by the extensions 100 which are received within the tubular sections and held in an adjusted position by bolt 102.

OPERATION

In use, the vehicle is driven into, for example, a field with a plurality of rows of laid pipe. The end of the first pipe section is placed on the trough 18, and the vehicle driven along the row of pipe. For fields with row crops, the wheel pairs 14 will follow the furrow without attention to steering so both the operate and worker may cooperate to handle the pipe sections as illustrated in FIG. 1. The conveyor belt 32 reduces wear on the pipe section and sprinkler fittings and runs at a slight speed gain over the vehicle speed so as to create a frictional bias drawing the pipe section out of the associated coupling. The angulated section 40 maintains the pipe in the middle of the trough so it is aligned with the angulation trough 20. The conveyor 46 in the angulation trough is also run at a speed gain over the vehicle's travel speed, producing a tendency for the coupling sections to be separated. The height of the angulation trough is adjusted so that as the end of the pipe section reaches the highest point on the conveyor 46, the pipe section will be at the proper relative angulation to the succeeding pipe section or coupling release. Since the release angulation varies considerably between the various types of pipe found in a field or fields, it is important to have the adjustment capability.

FIG. 3 illustrates a pipe section 200 in the approximate position for release. The pipe section 200 is raised to a substantial relative angulation to the succeeding pipe section. In this configuration, the pipe section need only be grasped by a worker or workers and lifted clear of the coupling. The worker then stacks the pipe section onto the rack 22. The rack 22 is used because it has the L-shaped horizontal support 68 which limits the horizontal travel of the pipe sections 200 and supports the flange 211 of the pipe section so that the risers 214 are held upright. At the completion of a row, the steering 17 is operated to execute a 180° turn so that the vehicle returns up the field in the opposite direction. Normally, the pipe sections in such a second row would be oriented so that the pipe sections, instead of coming on to the vehicle, with the female coupling ends first, come on to the vehicle with the male coupling end first. The uncoupling of pipe sections coming on to the vehicle in this manner is identical to that described above with the exception that the pipe sections are stacked on the rack 23. After a full load of pipe sections have been stacked in both of the racks 22 and 23, the vehicle is driven to an adjacent field where the pipe is to be laid.

For laying pipe, the vehicle is backed away from the pipe being laid and the coupled pipe is drawn off of and out of the trough 18. After the vehicle is aligned with the row in which the pipe sections are to be laid, the operator and worker grasp a section 200, as in FIG. 1, from the stack of sections on the rack and make a connection to the main line at the end of the row. The first section is then placed in the trough 18. The vehicle is then operated away from the first section. The worker and operator lift a second section from the stack of sections in readiness for coupling with the first sections. As the vehicle moves away from the first section, the female coupling ends reaches the relatively horizontal portion 24 of the trough at which point the male coupling end 210 is inserted into the female coupling end of the proceeding pipe section. The opposite end of the new section lowered into the trough to align the pipe section and to secure the coupling. For this operation, the angulation trough 20 is lowered so as to not interfer with the locking of the coupling but to provide guidance as necessary.

After a complete row is laid, male coupling ends first, the vehicle is positioned in alignment with the row for the next series of pipe sections. A pipe section from the opposite rack is then placed on the ground. To couple a female coupling end from a new pipe section onto the succeeding pipe section, the trough 18 is raised slightly from the position illustrated in FIG. 1, producing a substantial angulation of the pipe section at the point in the vehicle's travel where one end of the pipe section is on the ground and the other end of the pipe section is resting near the terminal end of the trough length 26. The angulation of the pipe section causes the male end of the pipe to be elevated above the conveyor 32 a sufficient distance to permit the succeeding female coupling end to be inserted over the male end with clearance under the coupled sections for the flange 211 and associated female coupling structure. Succeeding rows are laid in a similar manner until all of the pipe on the racks 22 and 23 is laid. The vehicle then returns to the field from which the pipe is being removed and takes on another load of pipe sections.

Where the pipe is to be stored or to be moved between distant fields, it is not efficient to use the vehicle for transporting pipe. Therefore, a trailer such as the trailer 104 outlined in FIG. 7 is utilized. The vehicle is operated until it is diagonally adjacent to the trailer 104 whereupon the wheel pairs 14 and 16 are turned 45°, to the position illustrated in FIG. 7. Further operation of the vehicle causes it to move diagonally to and alongside the trailer 104. It is then possible to operate the hydraulic cylinders 90 to cause the racks to move between the normal position such as is illustrated for rack 23 in full lines in FIG. 4 and the dotted line position which is utilized to transferring a load of pipe to the trailer 104. Further operation of the hydraulic cylinders causes an extension and a slight lowering of the racks 104 so that the load may be transferred to horizontal supports 106 on the trailer 104. The uprights 94 and 96 are then turned to their horizontal orientational and the pipes staked onto the bed of the trailer. Subsequent operation of the vehicle in reverse causes a diagonal movement away from the vehicle until the racks completely clear the trailer leaving the load of pipe in position on one half of the trailer. The vehicle is then operated to the other side of the trailer and an identical operation performed to unload the other half of the pipe onto the trailer. The vehicle may then return to the field and pick up additional loads of pipe, unloading them onto additional trailers, until all of the pipe is removed from the field. Thereafter, the vehicle itself may tow a trailer or trailers between distant fields so that no machine time is waiting for pipe to be loaded or unloaded. Alternatively, an auxiliary vehicle truck, tractor, etc, may be utilized to tow the trailers between two vehicles 10 so that a first vehicle is used exclusively for picking up pipe and a second vehicle to be used exclusively for laying pipe.

Having described my invention, I now claim:
1. A vehicle for picking up and laying irrigation pipe of the type consisting of a plurality of rigid sections and couplings between the sections forming a line of pipe, said vehicle comprising:
 a vehicular frame having a raised platform, inclined guide means mounted on said frame at a first end of said vehicle for guiding the end of a section of irrigation pipe being picked up from the ground level to above the level of said platform as said vehicle is operated toward said line of pipe and for guiding the pipe section down said guide means as said vehicle is operated away from said line of pipe, rack means adjacent said platform for supporting a plurality of said sections of irrigation pipe in stacked relationship, uncoupling means for uncoupling a section of said pipe being picked up from the subsequent pipe section, said uncoupling means comprising angulation guide means for guiding the free end of the leading pipe section and elevating said end relative to the longitudinal axis of the adjacent section.

2. A vehicle according to claim 1 wherein:
said incline guide means is centrally located on said vehicle.

3. A vehicle according to claim 2 wherein:
said incline guide means extends beyond said first end of said vehicle.

4. The vehicle according to claim 2 wherein:
two racks are mounted on said vehicle, each being adjacent to but on opposite sides of the centrally mounted inclined guide means.

5. The vehicle according to claim 4 wherein:
said racks are mounted for movement between a first position closely adjacent said inclined guide means and a second horizontally and outwardly displaced position.

6. The vehicle according to claim 5 wherein:
said racks comprise a plurality of horizontal support members carried on said vehicle by a parallel bar linkage.

7. The vehicle according to claim 6 including:
actuator means for powering said racks from said first to said second positions and,
said second positions being horizontally outwardly displaced from said vehicle and being lower than said first position.

8. The vehicle according to claim 7 wherein:
at least one of said horizontal support members incorporates a horizontal support flange for cooperating with a ground engaging flange of said pipe sections and holding said pipe sections aligned and with the sprinkler risers upright.

9. The vehicle according to claim 1 wherein:
said angulation guide means comprises a conveyor means for drawing said pipe sections onto said vehicle.

10. The vehicle according to claim 1 wherein:
said angulation means is inclined at a steeper angle than said inclined guide means.

11. The vehicle according to claim 10 wherein:
said angulation guide means and said inclined guide means are trough shaped.

12. The vehicle according to claim 1 wherein:
said pipe sections incorporate a ground engaging flange and an upright sprinkler riser,
said inclined guide means provides substantially continuous support for said end of pipe section between ground level and the level of said platform.

13. The vehicle according to claim 1 wherein:
said racks are mounted on said vehicle above the level of the said platform.

14. The vehicle according to claim 1 wherein:
said vehicle has forward and rearward pairs of wheels,
said pairs of wheels being mounted for selective coordinated angulation to at least approximately 45° from the longitudinal axis of said vehicle.

15. A vehicle for picking up and laying irrigation pipe of the type consisting of a plurality of rigid sections and couplings between the section forming a line of pipe, said vehicle comprising:
a vehicular frame having a raised platform,
inclined guide means mounted on said frame at a first end of said vehicle for guiding the end of a section of irrigation pipe being picked up from the ground level to above the level of said platform as said vehicle is operated toward said line of pipe and for guiding the pipe section down said guide means as said vehicle is operated away from said line of pipe,
rack means adjacent said platform for supporting a plurality of said sections of irrigation pipe in stacked relationship,
uncoupling means for uncoupling a section of said pipe being picked up from the subsequent pipe sections,
said inclined guide means having a first length and a second length, said first length having less inclination then said second length.

16. A vehicle for picking up and laying irrigation pipe of the type consisting of a plurality of rigid sections and couplings between the section forming a line of pipe, said vehicle comprising:
a vehicular frame having a raised platform,
inclined guide means mounted on said frame at a first end of said vehicle for guiding the end of a section of irrigation pipe being picked up from the ground level to above the level of said platform as said vehicle is operated toward said line of pipe and for guiding the pipe section down said guide means as said vehicle is operated away from said line of pipe,
rack means adjacent said platform for supporting a plurality of said sections of irrigation pipe in stacked relationship,
uncoupling means for uncoupling a section of said pipe being picked up from the subsequent pipe section,
conveyor means mounted on said inclined guide means for drawing said sections toward said vehicle.

17. A vehicle for picking up and laying irrigation pipe of the type consisting of a plurality of rigid sections and couplings between the section forming a line of pipe, said vehicle comprising:
a vehicular frame having a raised platform,
inclined guide means mounted on said frame at a first end of said vehicle for guiding the end of a section of irrigation pipe being picked up from the ground level to above the level of said platform as said vehicle is operated toward said line of pipe and for guiding the pipe section down said guide means as said vehicle is operated away from said line of pipe,
rack means adjacent said platform for supporting a plurality of said sections of irrigation pipe in stacked relationship,
uncoupling means for uncoupling a section of said pipe being picked up from the subsequent pipe section,
said inclined guide means is centrally located on said vehicle, two racks are mounted on said vehicle, each being adjacent to, but on opposite sides of, the centrally mounted inclined guide means, said racks are mounted for movement between a first position closely adjacent said inclined guide means and a second horizontally and outwardly displaced position, said racks comprising a plurality of horizontal support members carried on said vehicle by a parallel bar linkage, actuator means for powering said racks from said first to said second positions, said second positions being horizontally, outwardly displaced from said vehicle and being lower than said first position, a plurality of uprights on said horizontal support members, said uprights being selectively movable between a first upright position and a second position whereby said pipe may be withdrawn horizontally from said rack.

18. A vehicle for picking up and laying irrigation pipe of the type set forth in claim 1 wherein:

said inclined guide means comprises a continuous concave trough extending longitudinally of said vehicle and having a first end in proximity of ground level and a second end elevated to at least the level of said platform.

19. The vehicle according to claim 18 wherein:

the entry to said trough shaped guide means is flared.

* * * * *